United States Patent
Ebata

Patent Number: 5,889,461
Date of Patent: Mar. 30, 1999

[54] STRUCTURE FOR MOUNTING AN OPERATING MEMBER OF AN ELECTRICAL PART TO AN OPERATING SHAFT

[75] Inventor: Junichi Ebata, Miyagi-ken, Japan

[73] Assignee: Alps Electric Co., Ltd., Japan

[21] Appl. No.: 974,065

[22] Filed: Nov. 19, 1997

[51] Int. Cl.$^6$ ................................................ H01C 10/30
[52] U.S. Cl. ............................................................ 338/160
[58] Field of Search ................................... 338/160, 162, 338/163, 166, 174, 176, 118, 184, 190, 194

[56] References Cited

U.S. PATENT DOCUMENTS

| | | | |
|---|---|---|---|
| 3,795,882 | 3/1974 | Tokubo et al. | 338/128 |
| 3,902,152 | 8/1975 | Van Benthuysen et al. | 338/162 |
| 4,295,119 | 10/1981 | Kasashima et al. | 338/162 |
| 4,355,293 | 10/1982 | Driscoll | 338/184 |
| 4,403,211 | 9/1983 | Shibata et al. | 340/73 |
| 4,430,634 | 2/1984 | Hufford et al. | 338/164 |
| 4,739,300 | 4/1988 | Kuratani et al. | 338/162 |
| 5,567,337 | 10/1996 | Edwards et al. | 219/205 |

FOREIGN PATENT DOCUMENTS 07087121 3/1995 Japan .

*Primary Examiner*—Teresa Walberg
*Assistant Examiner*—Jeffrey Pwu
*Attorney, Agent, or Firm*—Brinks Hofer Gilson & Lione

[57] ABSTRACT

An electrical part including a step provided at a housing-facing side of an operating portion of an operating shaft, which protrudes externally from the housing, with the outside diameter of the step being smaller than the outside diameter of the operating portion. Thus, the load, produced when an operating member is being caulked to an end of the operating shaft, can be exerted on a flange surface at the step, so that even when the operating member is caulked to the operating shaft, the performance of the electrical part is not affected. Such an electrical part has been constructed in view of a conventional problem described below. When an attempt is being made to caulk an operating member to an operating shaft incorporated in a housing of a rotary sensor, or electrical part, to form a conventional rotary sensor. In this case, a sliding element bearing mounting portion at a side of the operating shaft, which is disposed in the housing, is suspended in mid-air in the housing, so that when a load W produced when caulking an end of the operating shaft, a force which tries to move the operating shaft rearward acts thereon, as a result of which the operating shaft tries to push the bearing in the housing rearward, thereby breaking the internal portion of the housing retaining the bearing.

3 Claims, 5 Drawing Sheets

STRUCTURE FOR MOUNTING AN OPERATING MEMBER OF AN ELECTRICAL PART TO AN OPERATING SHAFT

BACKGROUND OF THE INVENTION

1. Field of the Invention

The present invention relates to an electrical part including an operating shaft and an operating member mounted to the operating shaft, which can suitably be formed by caulking the operating member to the operating shaft protruding externally from a housing of the electrical part.

2. Description of the Related Art

Such an electrical part is described by taking as an example a rotary sensor, which has been disclosed by the applicant. The rotary sensor is mounted to a vehicle or the like in order to detect, for example, the height of the vehicle. As shown in FIG. 7, such a rotary sensor has a bearing 2 which is mounted in a housing. An operating shaft 23 is rotatably inserted into the bearing 2, and has an operating portion 23a protruding towards the front from one end of the housing 1. The outside diameter of an end of the operating portion 23a is made slightly smaller to form an oblong flat portion 23b, formed by cutting, at the smaller outer diameter portion. An externally threaded portion 23c, which is threaded along its outer periphery, is formed at the upper portion of the flat portion 23b.

A lever, being a plate-like operating member 4, or the like is inserted into the flat portion 23b. From above the lever, a washer 6 for preventing loosening is inserted onto the externally threaded portion 23c to fasten a nut 5 onto the externally-threaded portion 23c, whereby the operating member 4 is mounted to the operating shaft 23 so as not to rotate.

A sliding element bearing 7 is mounted to a sliding element bearing mounting portion 23d at the other end of the operating shaft 23 which is disposed in the housing 1, so that it does not get dismounted from the sliding element bearing mounting portion 23d.

A sliding element piece 8 is mounted to the sliding element bearing 7. A holder 10 having mounted thereto an insulating base 9 with a resistance pattern is mounted to the housing 1 so as to oppose the sliding element piece 8.

The back side of the holder 10 is filled with a filler 13 in order to seal the rear side of the housing 1. On the other hand, a sealant 14 is forced into the front side of the housing 1 in order to seal the front side of the housing 1. Accordingly, the front and back sides of the housing 1 are sealed to prevent entry of foreign material, such as dirt, into the housing 1.

Such a conventional rotary sensor, or electrical part, is constructed by securing and mounting the operating member 4 to the operating shaft 23 with a nut or the like. Therefore, a washer 6 for preventing loosening of a nut 5 needs to be inserted onto the threaded portion 23c, and time is required to fasten the nut 5. As a result, the electrical part cannot be assembled with high efficiency.

In addition, parts, such as a nut 5 or a washer 6, are needed to mount the operating member 4 to the operating shaft 23, thereby increasing the number of parts used, which results in higher costs.

When the operating member 4 is mounted to the operating shaft 23 by fastening them together with a nut 5 or the like, the electrical part is made taller in correspondence with the height H of the nut 5, thereby preventing size reduction of the electrical part.

Such problems can be overcome if the operating member 4 can be caulked to the operating member 23 by one punching operation by a jig (not shown) or the like, wherein a load W can be produced, while the operating shaft 23 is incorporated in the housing of the electrical part. When such a method is used, time does not have to be used to assemble the electrical part using screws or the like, thereby increasing the efficiency with which the assembly can be performed. In addition, it becomes unnecessary to use parts, such as a screw 5 or a washer 6, thereby decreasing the number of parts, which makes the electrical part cheaper to produce. Further, since a nut 6 or the like do not have to be used, the height of the electrical part can be kept small, thus allowing size reduction of the electrical part.

When an attempt is made to caulk the operating member 4 to the operating shaft 23 incorporated in the housing of the electrical part, or rotary sensor, the sliding element mounting portion 23d at the other side of the operating shaft 23, which is in the housing, is suspended in mid-air in the housing 1, as shown in FIG. 7, so that when a load W is exerted onto the other end 23e of the operating shaft 23, as shown in FIG. 8, a force which tries to move the operating shaft rearward acts thereon. As a result, the operating portion 23 of the operating shaft 23 tries to push the bearing 2 in the housing 1 rearward, which breaks the internal portion of the housing 1 which supports the bearing 2.

Such a problem can be overcome by forming a load receiving portion 10a which protrudes from the center of the holder 10, such that it contacts the sliding element bearing mounting portion 23d of the operating shaft 23, as shown in FIG. 8. In such a case, even when a load W is exerted on the end 23e of the operating portion 23a, the operating shaft 23 does not move downward. Thus, the internal portion in the housing 1 does not break, even when the operating shaft 23 is caulked to the operating member 4.

However, since the load receiving portion 10a and the end 23d are always in contact with each other, rotation of the operating shaft 23 produces frictional torque at the load receiving portion 10a and the end 23d, causing the rotational torque of the operating shaft 23 to become unstable, or powder to be produced at the end 23d as a result friction. The powder sticks onto a resistance pattern surface of the insulating base 9, and cuts the sliding element piece 8, resulting in poor performance of the rotary sensor, or the electrical part.

The problem of unstable rotational torque of the operating shaft 23 can be overcome by forming a through hole (not shown) in the load receiver portion 10a of the holder 10, and inserting a jig of about the same outside diameter as that of the sliding element bearing mounting portion 23d of the operating shaft into the through hole. The jig is brought into contact with the sliding element bearing mounting portion 23d to caulk the end 23e of the operating portion 23a to the operating member 4. In such a method, the load W produced by caulking can be exerted on the jig, so that the performance of the rotary sensor is not affected. However, the through hole in the holder 10 of the rotary sensor admits a filler 13, being filled into the back side of the holder 10, into the housing 1.

An attempt has been made to overcome the problem of admittance of filler 13 by opening a through hole, not only in the holder 10, but also in the filler 13 after it has solidified. However, such a method prevents proper sealing of the housing 1, so that dirt or the like enters into the housing 1 from the through hole, making it unsuitable as a method to be used in producing a rotary sensor or the like.

As can be understood from the foregoing description, there are various problems when the operating member is caulked, while the operating shaft 23 is incorporated in the housing of the rotary sensor, or the electrical part. Therefore, in conventional electrical parts, an operating member 4 is caulked to a single operating shaft 23, as shown in FIG. 9, for incorporation in the electrical part, or rotary sensor.

Levers, or operating members 4, are formed into difference shapes and sizes according to the convenience of the customers. Therefore, when an operating member 4 is caulked to a single operating shaft 23, as mentioned above, each time the customer changes, the efficiency with which the electrical part is assembled is reduced.

An attempt has been made to overcome such a problem by previously caulking the variety of operating members 4 to the operating shafts 23 and storing the operating members 4 caulked to the operating shafts 23 as semi-manufactured products. However, the use of such a method increases storage costs, thereby increasing the cost of electrical parts.

SUMMARY OF THE INVENTION

Accordingly, it is an object of the present invention to provide an electrical part, whose performance is not affected even when the operating member 4 is caulked to the operating shaft 3, while the operating shaft 23 is incorporated in a housing of the electrical part, and which can be assembled with fewer parts and with greater efficiency.

To this end, according to a first form, there is provided an electrical part comprising: a housing; an operating shaft supported by the housing, the operating shaft including an operating portion protruding externally from the housing; and an operating member, mounted to an end of the operating portion, for operating the operating shaft, wherein a small diameter portion is formed at a location of the operating portion, which is closer to the housing than an operating member mounting location, thereby forming a step at the operating portion.

According to a second form, the step may be formed into an oblong shape in cross section.

According to third form, a caulking jig for caulking the operating member to the operating shaft may be placed on the step in order to caulk the operating member to the operating shaft.

DESCRIPTION OF THE PREFERRED EMBODIMENTS

Figure 1:
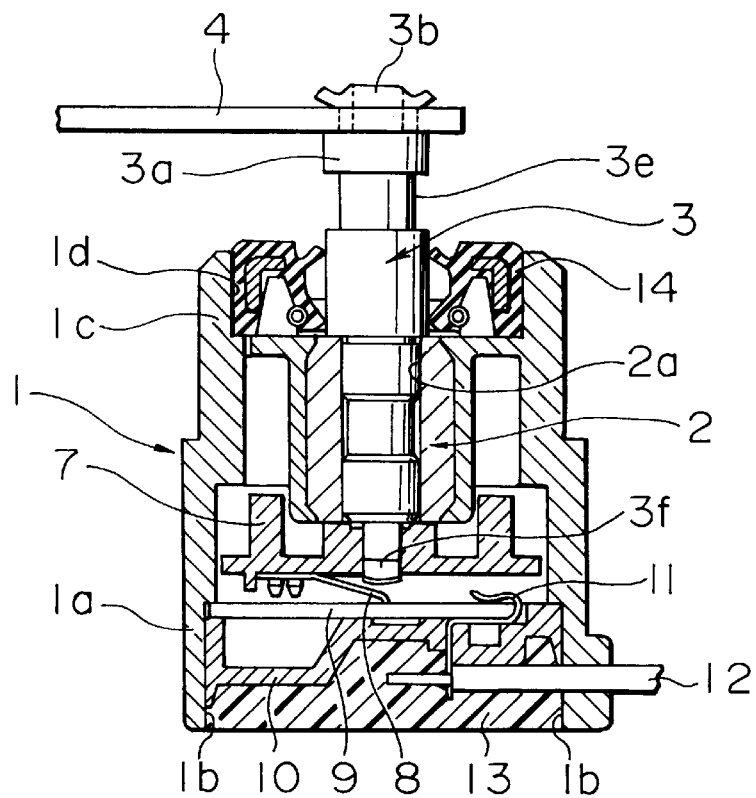
FIG. 1 is a sectional view of the main portion of an electrical part in accordance with the present invention.

A description will now be given of the preferred embodiments of the electrical part of the present invention, with reference to FIGS. 1 to 6. In the description, a so-called rotary sensor used, for example, in an automobile is taken as an example. Corresponding parts to those of the conventional electrical part will be given the same reference numerals.

FIG. 1 is a view showing a rotary sensor as an embodiment of an electrical part in accordance with the present invention. An opening 1b is formed in the rear portion 1a of a housing 1 made of synthetic resin or the like, with the interior of the housing 1 being hollow. A recess 1d is formed in the front portion 1c of the housing 1.

A metallic bearing 2 or the like is mounted into the housing 1, by insert molding or the like, at the same time the housing 1 is being formed.

A metallic operating shaft 3, made of stainless steel or the like, is rotatably inserted into a shaft hole 2a in the bearing 2, such that one side thereof protrudes externally from the front portion 1c side of the housing 1 to form the operating portion 3a.

Figure 2:
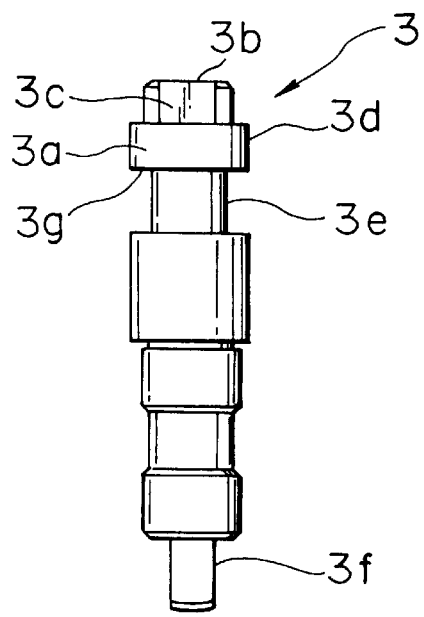
FIG. 2 is a plan view of the operating shaft of the electrical part in accordance with the present invention.

As shown in FIG. 2, the operating shaft 3 is formed such that the outer periphery of an end 3b of the operating portion. 3a is slightly smaller than that of the operating portion 3a, itself. An oblong flat portion is formed in the smaller outside diameter end 3b. The end 3b has a mounting surface 3d for mounting thereto an operating member 4 used for operating the operating shaft 3. With the operating shaft 3 inserted into the housing 1, a step 3e is formed at the housing 1 side of the operating portion 3a, with the outer diameter of the step 3e made smaller than that of the operating portion 3a. An oblong sliding member bearing mounting portion 3f, being a thin shaft, is formed at the other side of the operating shaft 3 disposed in the housing 1.

A flat flange surface 3g is formed at the step 3e, and is placed on a supporting plate J1 of a jig J to be described later, so as to contact a predetermined contact area thereof.

For example, a lever, being a plate-shaped operating member 4 made of a metal, synthetic resin, or the like, is inserted into the end 3b of the operating portion 3a. The lever is then placed on the mounting surface 3d in order to caulk the end 3b, using the caulking jig J, whereby the operating shaft 3 and the operating member 4 are integrally formed.

A sliding element bearing 7, made of synthetic resin or the like, is, for example, press-fitted and mounted to a sliding element bearing mounting portion 3f disposed at the other end of the operating shaft 3, which is disposed in the housing 1. Accordingly, the sliding element bearing 7 is incorporated in the housing 1 so as not to get dismounted from the sliding element bearing mounting portion 3f.

A springy sliding element piece 8 is mounted to the sliding element bearing 7. At the side opposing the sliding element bearing 7, a holder 10 having an insulating base 9 mounted thereto is press-fitted at a predetermined location to an opening 1b in the housing 1.

A terminal 11 with one end formed into a clip-like shape is mounted to an end of the insulating base 9 mounted to the holder 10. A lead wire 12 is soldered to the other end of the terminal 11, causing the lead wire 12 and the terminal 11 to be in an electrically conductive state.

The opening 1b of the housing 1 in the back side of the holder 10 is filled with a filler 13, made of thermosetting resin or the like, in order to seal the housing 1.

A sealant 14 is forced into a recess 1d at the front portion 1c side of the housing 1. Thus, the front and the back sides of the housing are sealed to prevent entry of foreign material, such as dirt, into the housing 1.

When such a rotary sensor with the above-described construction is mounted to the body of a vehicle to measure a change in the vehicle height, an external load is exerted in the direction of rotation onto the operating member 4 caulked to the operating shaft 3, causing the operating shaft 3 to rotate. The rotation causes the sliding element piece 8 mounted to the sliding element bearing 7 to slide along a resistance pattern surface of the insulating base 9, changing the resistance value thereof, in terms of which the vehicle height can be detected.

Such a rotary sensor, described as an electrical part, which has the above-described construction is assembled as follows. First, the sealant 14 is forced into the recess 1d in the front portion 1c of the housing 1. Then, from the opening 1b in the rear portion 1a of the housing which has the sealant 14 provided therein, the sliding element bearing 7 having the sliding element piece 8 mounted thereto is inserted into the housing 1. Thereafter, from an opening in the sealant 14, the operating shaft 3 is inserted into the housing 1. Press-fitting the sliding element bearing 7 to the sliding element bearing mounting portion 3f of the operating shaft 3, using a jig (not shown) or the like, integrally forms the sliding element bearing 7 with the operating shaft 3 in the housing 1, such that the operating shaft 3 does not get dismounted from the sliding element bearing 7. The sliding element bearing 7 is constructed so as to be rotatable in response to the rotation of the operating shaft 3.

When the holder 10 having mounted thereto the insulating base 9 mounted to the clip portion of the terminal 11 is press-fitted to the opening 1b in the housing 1, the sliding element piece 8 press-contacts a resistance pattern surface (not shown) of the insulating base 9. The lead wire 12 is soldered to the end of the terminal 11 which protrudes from the rear surface side of the holder 10.

Thereafter, when the filler 13, injected into the rear side of the holder 10 solidifies, the housing 1 of the rotary sensor is sealed.

Figure 3:
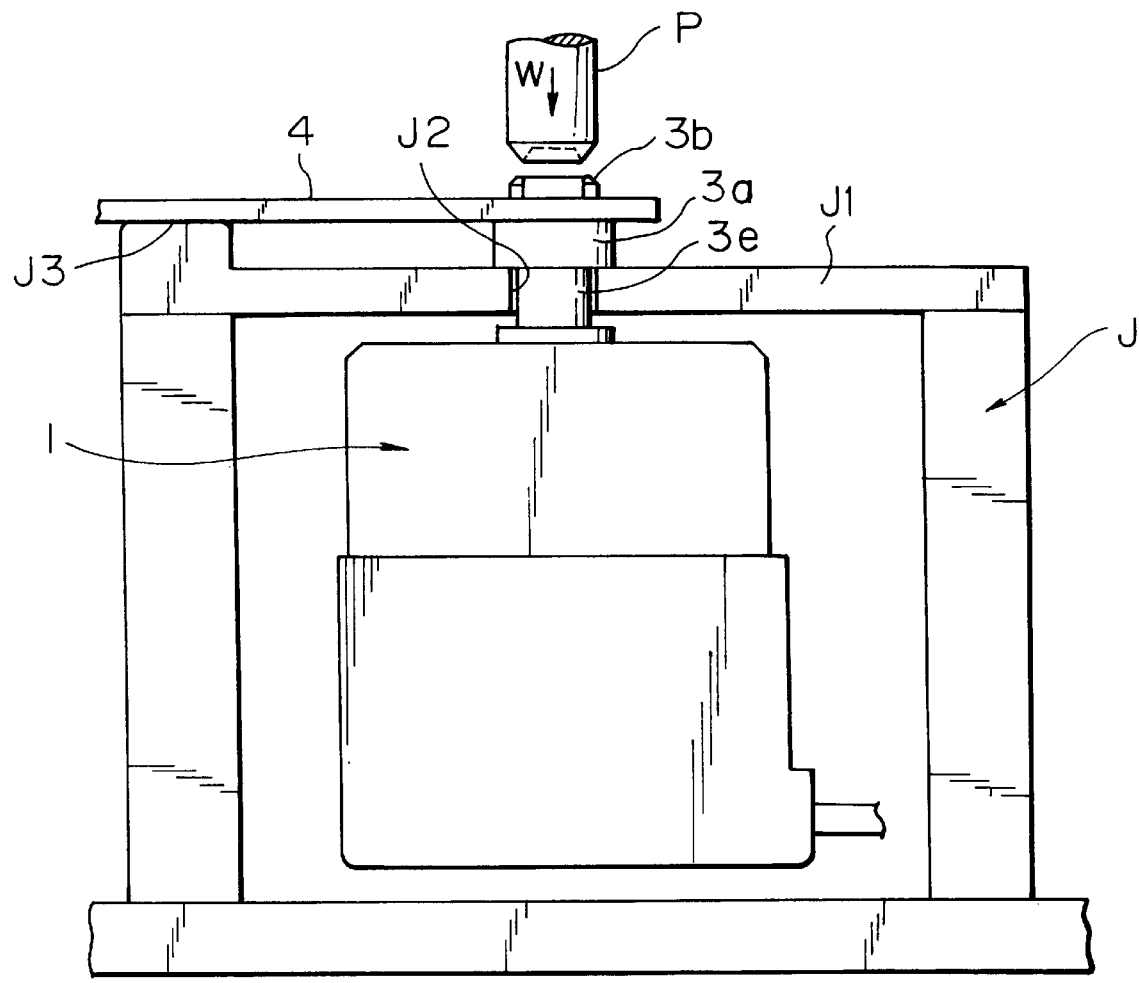
FIG. 3 is a front view showing a caulking jig used to caulk the operating member of the electrical part of the present invention.
Figure 4:
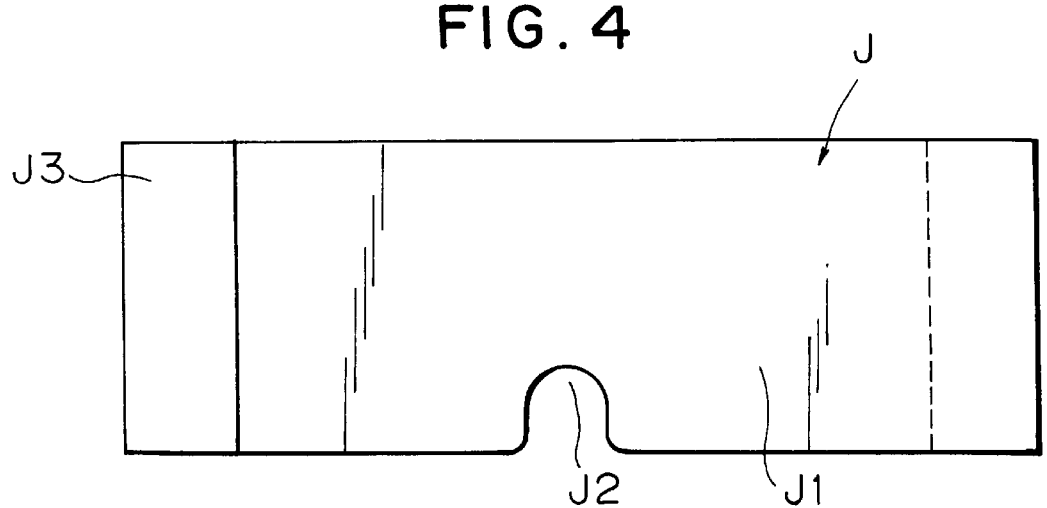
FIG. 4 is a top view of the caulking jig of FIG. 3.

Next, the step 3e formed at the operating portion 3a of the operating shaft 3, which protrudes towards the front to the outside from the front portion 1c of the housing 1, is inserted deep into a groove J2 of the supporting plate J1 of the caulking jig J of FIG. 3, which is mounted to a press (not shown) or the like. This causes the flange surface 3g at the step 3e of the operating shaft 3 to contact a surface around the groove J2 of the supporting plate J1 with a predetermined contact area, whereby the electrical part is set on the caulking jig J, with the rear portion 1a of the housing 1 suspended in mid-air above the bottom surface of the caulking jig J.

Thereafter, when the lever, or the operating member 4, is positioned at the end 3b of the operating shaft 3, and inserted therein, the operating member 4 is placed on the mounting surface 3d of the operating portion 3a. At this time, an end side of the operating member 4 in the longitudinal direction contacts a protrusion J3 at an end of the supporting plate J1 of the jig J, so that the operating member 4 is in a horizontal position.

Using a punch P mounted to an upper die of the caulking jig J, the outer peripheral side of the end 3b of the operating shaft 3 is caulked to the operating member 4, by making use of the pressing force of the aforementioned press. When the caulking is performed, the load W of the punch P is exerted on a peripheral portion of the flange surface 3g of the operating shaft 3 and the groove J2 of the supporting plate J1, making it possible to caulk and thereby fix the operating member 4 to the operating shaft 3 by the punch P which presses the outer peripheral side of the end 3b of the operating shaft 3 outwardly to a larger area, while cutting the outer peripheral side thereof.

At this time, the housing 1, which is supported by the supporting plate J1 of the caulking tool J, is suspended in mid-air, so that all of the load W exerted on the punch P is exerted on the flange surface 3g at the step 3e of the operating shaft 3. For this reason, no load produced during caulking is exerted to the inside portion of the housing 1 of the rotary sensor (electrical part), so that the performance of the electrical part is not affected in any way.

Figure 5:
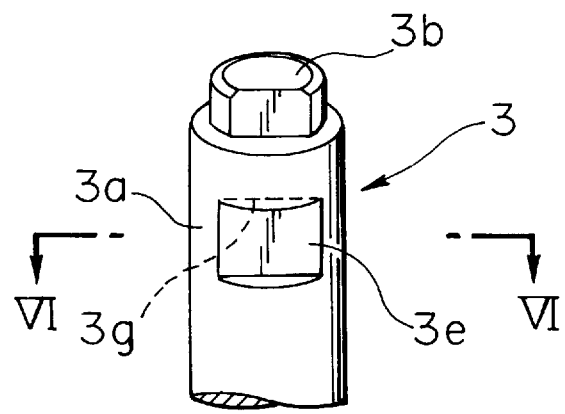
FIG. 5 is a view showing an operating shaft of another embodiment in accordance with the present invention.
Figure 6:
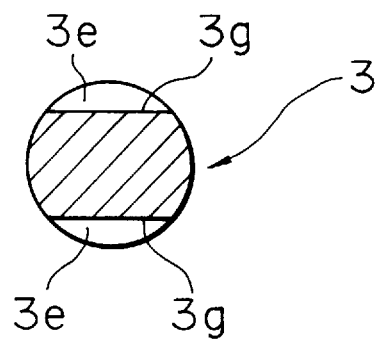
FIG. 6 is a sectional view taken along line VI—VI of FIG. 5.
Figure 7:
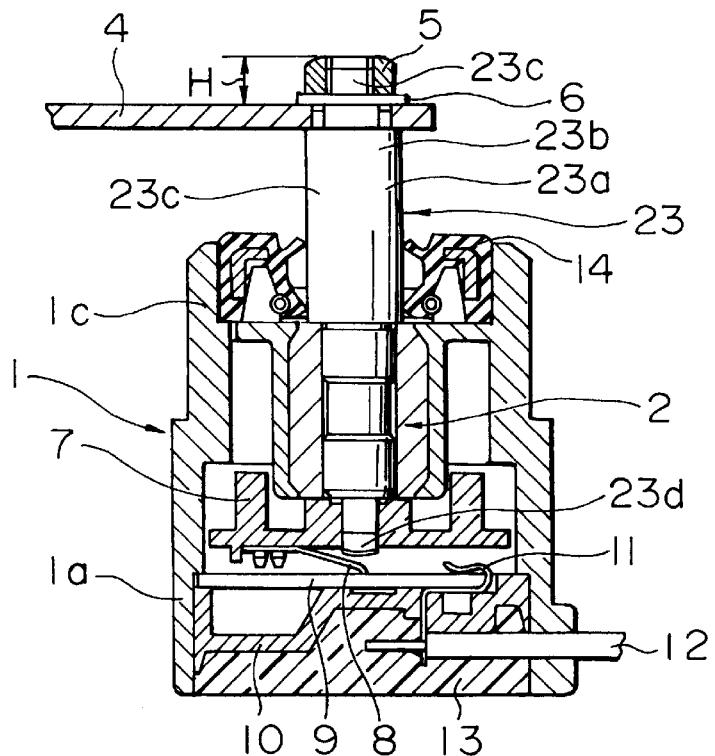
FIG. 7 is a sectional view showing the main portion of a conventional electrical part.
Figure 8:
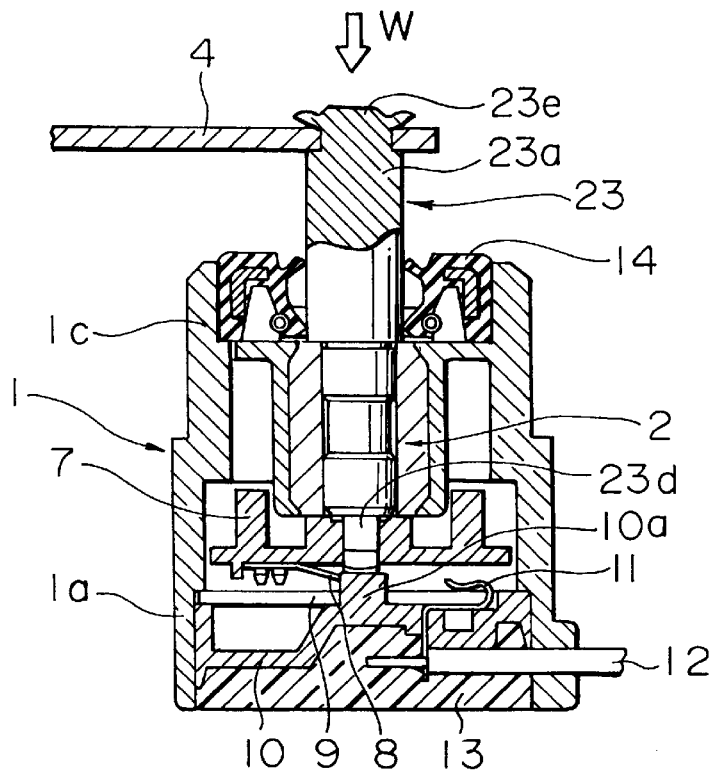
FIG. 8 is a sectional view showing the main portion where the operating member is caulked and mounted to the operating shaft of the conventional electrical part.
Figure 9:
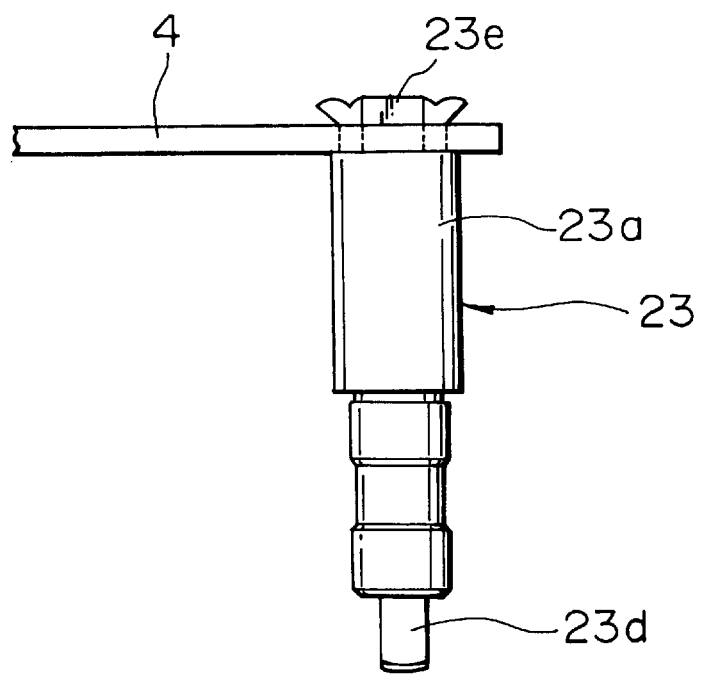
FIG. 9 is a front view showing the operating member caulked to a single operating shaft of the conventional electrical part.

In another embodiment of the present invention, as shown in FIGS. 5 and 6, part of the operating portion 3a is cut to form a step 3e of the operating shaft 3 into an oblong shape in section, so that a crescent-shaped, flange-like surface 3g is exposed to the outside at the flat portion. The load of the punch P of the caulking jig J can be exerted onto the crescent-shaped, flange-like surface 3g.

Although in the foregoing description, the operating shaft 3 of the electrical part was described as being made of a metal, such as aluminum, the operating shaft may be made of other materials, such as synthetic resin.

A small outside diameter portion is formed at a portion of the operating shaft, which protrudes externally from the housing 1, so as to be disposed closer to the housing than the operating member mounting position of the operating portion, whereby a step is formed. Therefore, the flange surface at the step can be subjected to the load produced when the operating member is being caulked to the operating shaft.

Consequently, even when the operating member is caulked to the operating shaft, the performance of the electrical part is not affected, and the operating member can be easily mounted to the operating shaft, using fewer component parts, thereby reducing the cost of the electrical part.

In addition, since the step can be easily formed into an oblong shape in cross section very precisely by a simple processing method, so that a cheap operating shaft can be produced with high precision. Further, during caulking of the operating member, the operating shaft does not rotate, since the operating shaft can be easily held by a jig, thereby allowing the caulking to be carried out very easily.

What is claimed is:

1. An electrical part, comprising:

a housing;

an operating shaft supported by said housing, said operating shaft including an operating portion protruding externally from said housing; and an operating member, mounted to an end of said operating portion, for operating said operating shaft, wherein said operating member is mounted to said operating shaft by caulking one end of said operating portion and wherein a step is formed at said operating portion by forming a small diameter portion at said operating portion below said operating member.

2. An electrical part according to claim 1, wherein said step is formed into an oblong shape in cross section.

3. An electrical part according to claim 1, wherein a caulking jig for caulking said operating member to said operating shaft is placed on said step in order to caulk said operating member to said operating shaft.

* * * * *

UNITED STATES PATENT AND TRADEMARK OFFICE
CERTIFICATE OF CORRECTION

PATENT NO. : 5,889,461
DATED : March 30, 1999
INVENTOR(S) : Junichi Ebata

It is certified that error appears in the above-identified patent and that said Letters Patent is hereby corrected as shown below:

On the Title Page

In column 1, after Item [22], insert 2 new lines as follows:

--Foreign Application Priority Data

Nov. 20, 1996   [JP]   Japan           8-324539--.

Signed and Sealed this

Thirty-first Day of August, 1999

Attest:

Q. TODD DICKINSON

*Attesting Officer*       Acting Commissioner of Patents and Trademarks